April 21, 1931. J. J. RAWLINGS 1,802,270
METALLIC WALL PLUG
Filed July 14, 1927
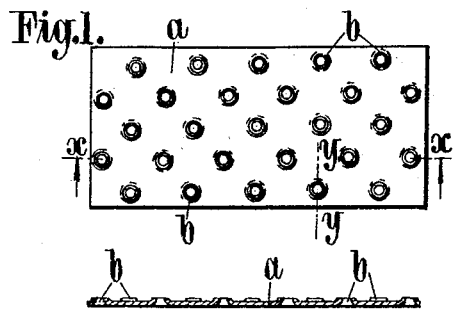
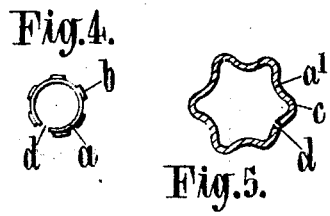
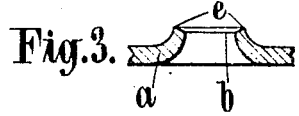
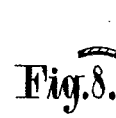
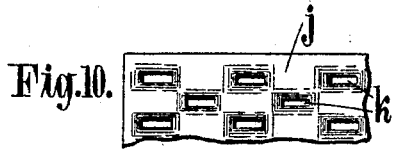
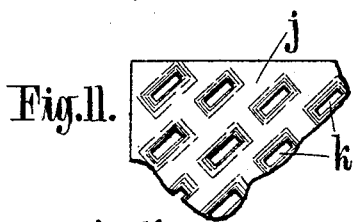
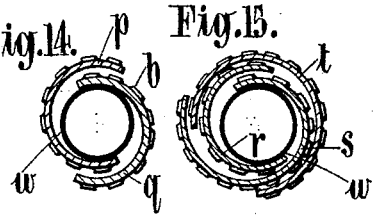
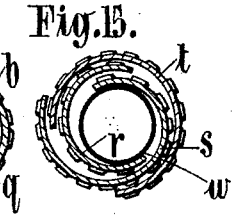
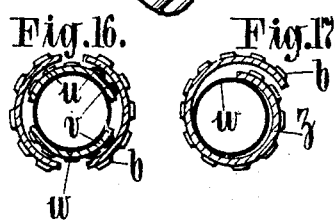
INVENTOR
John J. Rawlings
BY
ATTORNEY Patented Apr. 21, 1931

1,802,270

UNITED STATES PATENT OFFICE

JOHN JOSEPH RAWLINGS, OF LONDON, ENGLAND, ASSIGNOR OF ONE-HALF TO THE RAWLPLUG COMPANY LIMITED, OF LONDON, ENGLAND

METALLIC WALL PLUG

Application filed July 14, 1927, Serial No. 205,773, and in Great Britain July 24, 1926.

This invention relates to improvements in metallic wall plugs intended to be inserted in holes in materials such as brick, plaster, marble and the like, in order to form a sleeve or lining in the hole serving as a key between the wall of the hole and a screw, nail or the like, inserted in the plug.

It has been proposed with a slotted tubular plug of springy material, to bend portions of the said tube outwardly to form spikes or pointed hook-like projections which are forced into the wall of the socket in which the plug is inserted when a nail or the like is driven into the said plug. When the nail or the like is withdrawn from the plug, the plug contracts and assumes its initial configuration, and consequently the outwardly projecting portions which form spikes or hook-like projections are withdrawn out of the wall of the socket.

According to this invention the metallic wall plug, which is of tubular form, is split from end to end and is adapted to be expanded by a rotary movement, about the axis of the tube, of one edge of the slit relatively to the other edge thereof. Asperities, projections, tongues, bosses or the like are provided on the wall of the plug, which asperities or the like are susceptible of being progressively and permanently crushed or deformed against the wall of a hole or socket under pressure exerted in expanding the tube. Thus when a screw, nail or the like, is driven into the plug, the tubular structure is expanded so as to fill completely the hole in which it is inserted. The opposed surfaces of overlapping parts of the tubular structure are by this operation caused to approach more closely together, thus crushing or deforming the said asperities, projections or the like, so that, in some cases, the said opposed surfaces are brought into close contact. In the case of a screw, the outer edges or tips of the screw thread form a spiral corrugation within the plug whereby the screw is held firmly in position in the plug, which is simultaneously caused to grip firmly the walls of the hole in which it has been placed.

In the accompanying drawing:—

Figure 1 shows a sheet of metal provided with punched holes forming asperities.

Figure 2 shows a section on the line X—X, Figure 1.

Figure 3 shows a section on the line Y—Y, Figure 1.

Figure 4 is an end view of a sheet of metal, such as shown in Figure 1, bent to form a wall-plug in accordance with this invention.

Figure 5 is an end view of a wall-plug in accordance with this invention formed from a sheet of corrugated metal.

Figures 6, 7, 8 and 9 are views similar to Figure 2 showing sections of different forms of sheet metal adapted to form wall plugs in accordance with this invention.

Figures 10 and 11 are views similar to Figure 1 of parts of metal sheets embossed with patterns suitable for the construction of the improved wall-plugs.

Figure 12 is an end view of a wall-plug provided with spherical protuberances in accordance with the invention.

Figures 13, 14, 15 and 16 are end views of wall-plugs built up of tubular segments.

Figure 17 is an end view of a wall-plug provided with a paper lining.

Referring to Figures 1 and 2, $a$ is a sheet of metal having holes $b$ punched therein in such a manner as to produce on one side of the sheet $a$ burrs, pips, or other asperities formed by the protruding and rough edges $e$ (see Figure 3) around the punched hole $b$. This sheet $a$ is brought to the form of an unclosed cylinder, Figure 4, having the asperities or irregular projections $b$ upon the exterior surface thereof. When the wall-plug, thus formed is placed in a suitably formed hole in brick, plaster or the like and when a screw, nail or the like is driven therein, the wall plug expands to fill the hole by crushing, flattening or otherwise deforming the asperities $b$. The improved wall plug may be constructed from a sheet of metal $a'$, Figure 5, having corrugations $c$ thereon which may be arranged in any suitable pattern or design and be of any convenient form, for example any of the forms $f$, $g$, $h$, or $i$ as shown in Figures 6, 7, 8 and 9 respectively.

Another convenient form of sheet metal from which to form a wall plug is shown in Figure 10, in which the sheet $j$ is embossed or stamped in any convenient pattern with bosses or studs $k$ projecting upon one side of the metal and has corresponding hollows upon the reverse side thereof. For example, in Figure 10 the metal sheet is embossed with a number of disconnected ridges arranged in the longitudinal direction and in Figure 11 the lines of bosses or studs $k$ are arranged in an oblique direction.

In another arrangement shown in Figure 12, a tubular metal structure $l$ is formed with spherical protuberances $m$ arranged in diametrically opposite pairs, each pair being on a transverse axis of the tube perpendicular to the axis to the pair next adjacent thereto.

As shown in Figures 4 and 5, the improved wall plug is of unclosed tubular form having a gap $d$, but the wall plug can, however, conveniently be made with overlapping parts $n$, $o$ as shown in Figure 13. The tubular structure can also be formed of two or more pieces of metal bent to an arc extending, for example, around an angular distance of about 270°. Thus the wall plug may comprise parts $p$, $q$ as shown in Figure 14, these parts being arranged one within the other with parts of each overlapping the other exteriorly, the overlapping parts being preferably substantially equal at the opposite lateral edges of each segmental tubular part.

In some instances, as in Figure 15, the tubular structure can be built up of a number of pieces of metal, such as hereinabove described, brought to the shape of tubular segments extending around an angular distance of more than 180°, or, as shown in Figure 16, extending around an angular distance of less than 180°.

In Figure 15 the parts $s$, $t$ are stepped successively one in another, the stepping being either right handed or left handed according to the twist of the screw to be inserted therein. In Figure 16 the parts $u$ are entirely exterior to the parts $v$. In wall plugs constructed of separate parts, as shown in Figures 14 to 16, the several parts may be held together by binding wires, by bent over clips formed from parts of the tubular segments, by the resiliency of the latter, by supporting these parts on a hollow core or tube, such as the tube $w$, or by an adhesive material such as pitch, resin or the like.

In all cases the metal can be coated on one or both sides with pitch, bitumen, resin or the like with or without the admixture therewith of a fibrous material.

It has also been found of advantage in certain cases to provide the metal wall plug $z$ with an interior lining $w$ of paper or like material, as shown in Figure 17.

A coating of a suitable lubricating material may be applied to the said lining $w$, or the latter can be impregnated with the lubricating material.

The tubular structures thus provided, as will be readily understood, are capable of being expanded by screws, nails or the like inserted therein, the projections, ridges or the like formed thereon becoming deformed or crushed in this operation to an amount which varies in accordance with the size of the screw or the nail so that, for a hole of given size, any particular plug can be used equally efficiently for screws of different sizes, within limits, a larger screw, for example, causing a greater deformation of the projections than would be caused by a screw of a smaller size.

The metallic plugs are preferably made of a relatively soft or malleable metal, such as hard lead, zinc, copper, or alloys of a similar nature, which can be caused to flow to a greater or less extent under the effects of pressure.

I claim:—

1. A wall plug of sheet metal forming an unclosed tubular structure with the longitudinal edges overlapped radially, spacing pieces in the form of rims surrounding holes in the metal and projecting into the space between opposed faces of the overlapped parts, and deformable asperities in the form of rims surrounding holes and projecting from the exposed outer surfaces of the tubular structure.

2. A wall plug of sheet metal forming an unclosed tubular structure comprising a plurality of longitudinal strips having their longitudinal edges overlapped radially, spacing pieces projecting into the space between the overlapped parts, and a tubular core of paper supporting the said strips in tubular formation.

JOHN JOSEPH RAWLINGS.